United States Patent
Oue et al.

(10) Patent No.: US 8,956,266 B2
(45) Date of Patent: Feb. 17, 2015

(54) VEHICLE DRIVING FORCE CONTROL DEVICE

(75) Inventors: Toshiya Oue, Okazaki (JP); Kazufumi Hayashikawa, Nagoya (JP); Katsutoshi Nagura, Okazaki (JP); Keisuke Imoto, Nagoya (JP); Hiroaki Miyamoto, Okazaki (JP); Yasuyuki Hatsuda, Okazaki (JP); Takanori Sugimoto, Tsushima (JP); Norihiko Hatsumi, Anjyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 645 days.

(21) Appl. No.: 13/276,549

(22) Filed: Oct. 19, 2011

(65) Prior Publication Data

US 2012/0100958 A1    Apr. 26, 2012

(30) Foreign Application Priority Data

Oct. 20, 2010    (JP) ................. 2010-235213

(51) Int. Cl.
*F16H 61/20* (2006.01)
*B60W 30/18* (2012.01)
*B60W 10/08* (2006.01)
(Continued)

(52) U.S. Cl.
CPC ......... *B60W 30/18063* (2013.01); *B60W 10/08* (2013.01); *B60W 50/029* (2013.01); *B60W 50/038* (2013.01); *B60W 10/188* (2013.01); *B60L 11/123* (2013.01); *B60L 11/14* (2013.01); *B60W 2510/182* (2013.01); *B60W 2540/12* (2013.01); *B60W 2710/105* (2013.01); *Y02T 10/7258* (2013.01); *B60W 2710/083* (2013.01); *B60W 2710/182* (2013.01); *Y02T 10/7077* (2013.01); *Y02T 10/6217* (2013.01); *Y02T 10/70* (2013.01)
USPC ............................................. 477/93; 477/144

(58) Field of Classification Search
USPC ................................................... 477/93, 114
See application file for complete search history.

(56) References Cited

U.S. PATENT DOCUMENTS 3,975,060 A    8/1976    Hirayama
6,358,182 B1    3/2002    Eguchi
(Continued)

FOREIGN PATENT DOCUMENTS

CN    1759030 A    4/2006
CN    101249827 A    8/2008
(Continued)

OTHER PUBLICATIONS

Extended European Search Report issued May 7, 2013.
(Continued)

*Primary Examiner* — Derek D Knight
(74) *Attorney, Agent, or Firm* — Birch, Stewart, Kolasch & Birch, LLP

(57) ABSTRACT

A vehicle driving force control device includes: a brake unit configured to generate a brake force of a vehicle; a stroke amount detecting unit configured to detect a stroke amount of a brake pedal of the vehicle; a monitoring unit configured to monitor whether generation of the brake force of the brake unit is abnormal; and a creep torque controlling unit configured to increase a reduction amount of a creep torque of the vehicle as the stroke amount increases, when the monitoring unit determines that the generation of the brake force in the brake unit is abnormal.

5 Claims, 6 Drawing Sheets

(51) Int. Cl.
*B60W 50/029* (2012.01)
*B60W 50/038* (2012.01)
*B60W 10/188* (2012.01)
*B60L 11/12* (2006.01)
*B60L 11/14* (2006.01)

(56) References Cited

U.S. PATENT DOCUMENTS

| | | | |
|---|---|---|---|
| 2002/0029943 | A1 | 3/2002 | Totsuka et al. |
| 2003/0225501 | A1 | 12/2003 | De La Salle et al. |
| 2006/0232127 | A1 | 10/2006 | Scherer |
| 2010/0049414 | A1 | 2/2010 | Ohtomo et al. |
| 2010/0235043 | A1 | 9/2010 | Seta et al. |

FOREIGN PATENT DOCUMENTS

| | | |
|---|---|---|
| DE | 10 2009 037 190 A1 | 2/2010 |
| JP | 54-55925 A | 5/1979 |
| JP | 2000-127805 A | 5/2000 |
| JP | 2001-165299 A | 6/2001 |
| JP | 2004-282903 A | 10/2004 |
| JP | 2007-60761 A | 3/2007 |
| JP | 2010-75036 A | 4/2010 |
| JP | 2010-126106 A | 6/2010 |
| JP | 2010-162914 A | 7/2010 |

OTHER PUBLICATIONS

Chinese Office Action issued on Nov. 8, 2013 in the corresponding Chinese Application No. 201110318861.01 with an English translation.

US 8,956,266 B2

VEHICLE DRIVING FORCE CONTROL DEVICE

BACKGROUND OF THE INVENTION

The present invention relates to a vehicle driving force control device controlling a driving force of a vehicle.

In an engine automatic transmission vehicle (hereinafter, referred to as an engine AT vehicle), even though an accelerator pedal is not operated, the vehicle can be slowly started (a creep phenomenon). Even in an electrically-driven vehicle such as an electric vehicle or a hybrid vehicle, the same control is performed. That is, even though the accelerator pedal is not operated, excitation current of a driving motor is controlled to control a creep torque, such that the vehicle can be slowly started.

In a brake apparatus of a vehicle, a negative pressure type or a positive pressure type boosting device is provided assisting a force (a stepping force) for stepping a brake pedal, and a pressure of a brake fluid (hereinafter, referred to as a brake fluid pressure) is increased by using the boosting device to increase the brake force. However, when a pressure generating device supplying negative pressure or positive pressure is faulty, a pressure cannot be supplied to the boosting device. In such case, even though a driver's stepping force is the same, the brake fluid pressure is reduced as much as the assisting force by the boosting device is removed. When the creep torque is controlled (reduced) by a value of the brake fluid pressure, it is difficult to reduce the creep torque, and as a result, a driver may feel as if a vehicle is pushed out and feel a sense of incompatibility.

In JP-2004-282903A, the creep torque generated in a motor is determined according to a stroke amount of the brake pedal, but it is not distinguished whether the brake apparatus is normal or abnormal, and as a result, even when the brake force is reduced or is abnormal, the creep torque is controlled in the same manner as it is controlled when the brake apparatus is normal, such that the driver may feel as if the vehicle is pushed out and feel the sense of incompatibility.

Meanwhile, in JP-2010-075036A, when a brake is faulty, the creep torque is reduced depending on a vehicle velocity, but relevance to the brake pedal is not described and the driver may feel the sense of incompatibility.

SUMMARY

It is therefore an object of the invention to provide a vehicle driving force control device in which a creep torque is reduced when the brake force is erroneously generated thereby eliminating the feeling as if a vehicle is pushed out.

In order to achieve the object, according to the invention, there is provided a vehicle driving force control device comprising: a brake unit configured to generate a brake force of a vehicle; a stroke amount detecting unit configured to detect a stroke amount of a brake pedal of the vehicle; a monitoring unit configured to monitor whether generation of the brake force of the brake unit is abnormal; and a creep torque controlling unit configured to increase a reduction amount of a creep torque of the vehicle as the stroke amount increases, when the monitoring unit determines that the generation of the brake force in the brake unit is abnormal.

The creep torque controlling unit may increase the reduction amount of the creep torque as the stroke amount increases in a range of a dead zone of the brake pedal.

The brake unit may include a boosting unit that assists a stepping force for the brake pedal based on the detected stroke amount, and the monitoring unit may determine that the generation of the brake force in the brake unit is abnormal when performance of the boosting unit is abnormal.

The brake unit may include a pressure generating unit that generates a pressure supplied to the boosting unit, and the monitoring unit may periodically drive the pressure generating unit even when the performance of the boosting unit is abnormal.

The brake unit may generate the brake force by using a fluid pressure of a brake fluid and include a fluid pressure detecting unit that detects the fluid pressure of the brake fluid, and the monitoring unit may determine that the generation of the brake force in the brake unit is abnormal when the detected fluid pressure of the brake fluid is reduction abnormal.

DETAILED DESCRIPTION OF EMBODIMENTS

Hereinafter, a vehicle driving force control device according to an exemplary embodiment of the present invention will be described with reference to FIGS. 1 to 7.

In the exemplary embodiment, an electric vehicle (EV) is described as an example, but the present invention may be applied to a hybrid vehicle or an engine AT vehicle. A negative pressure type brake boosting device is described as a boosting device, but the present invention may be applied to a positive pressure type brake boosting device and a boosting device assisting a stepping force by a motor. A type that generates a brake force by using a pressure of a brake fluid is described as a brake unit, but the present invention may be applied to a type directly generating the brake force by the motor.

First Exemplary Embodiment

Figure 1:
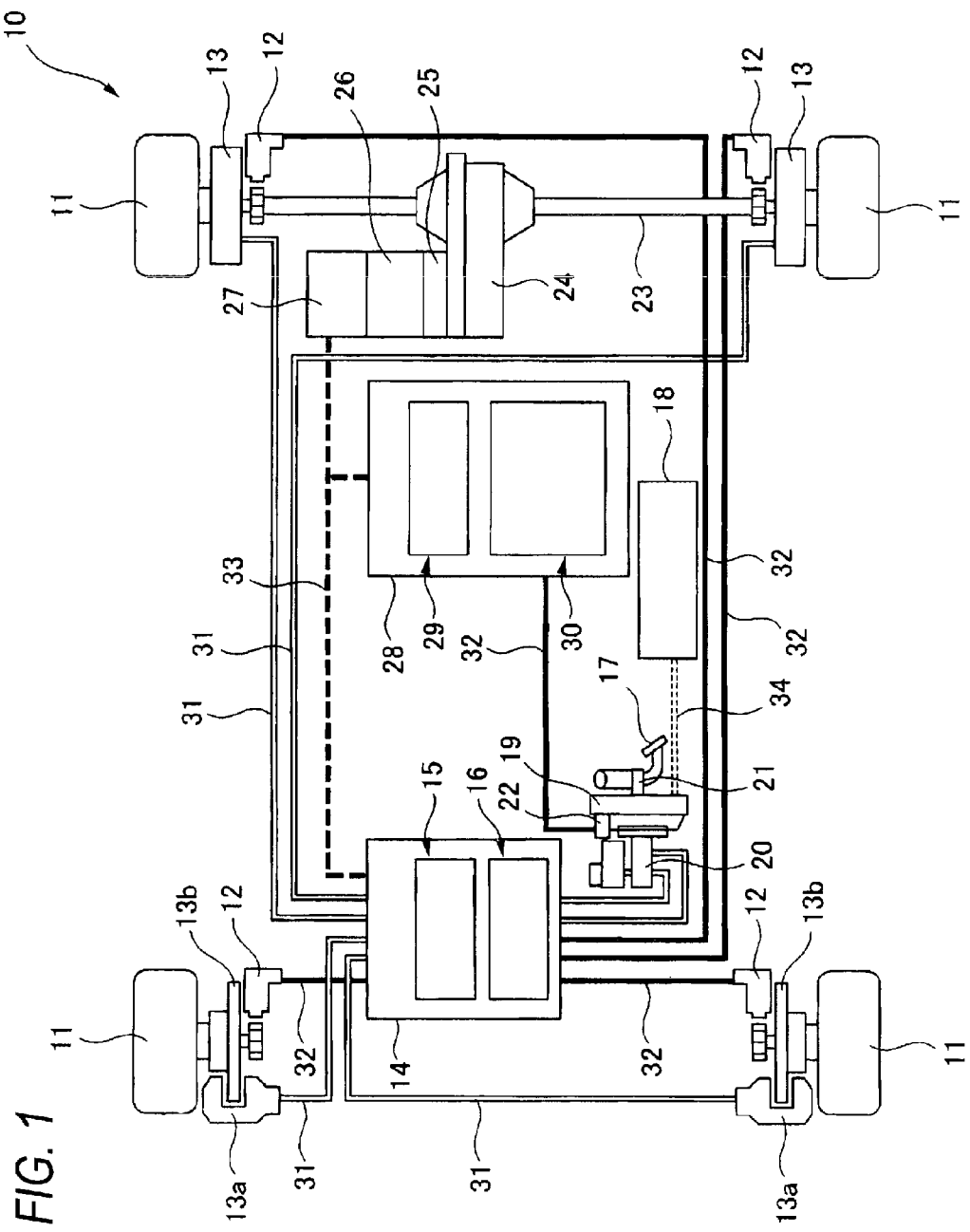
FIG. 1 is a schematic configuration diagram showing an example of a vehicle driving force control device according to an exemplary embodiment of the present invention.
Figure 2:
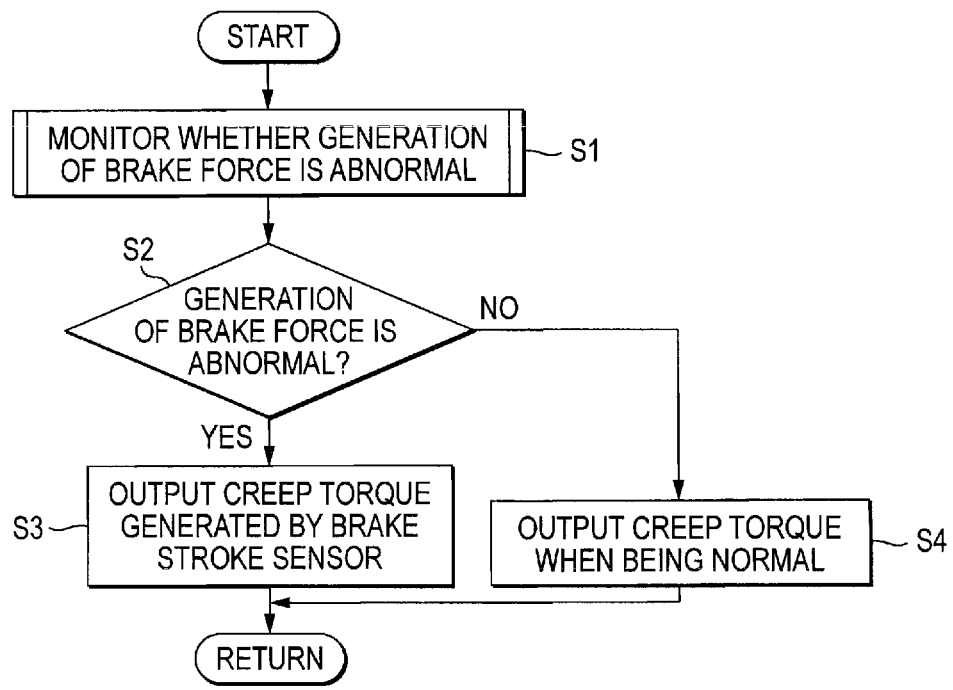
FIG. 2 is a flowchart explaining control in the vehicle driving force control device shown in FIG. 1.
Figure 3:
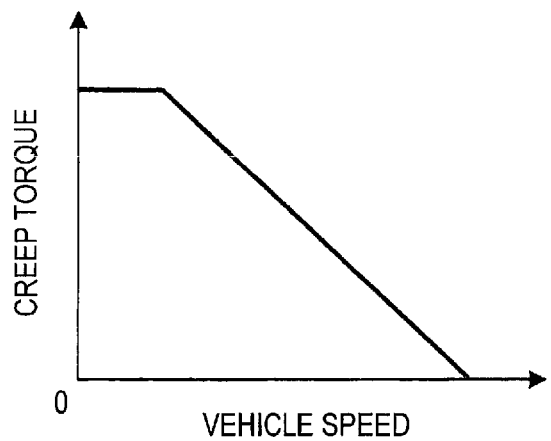
FIG. 3 is a graph showing a relationship between a vehicle velocity and a creep torque.
Figure 4:
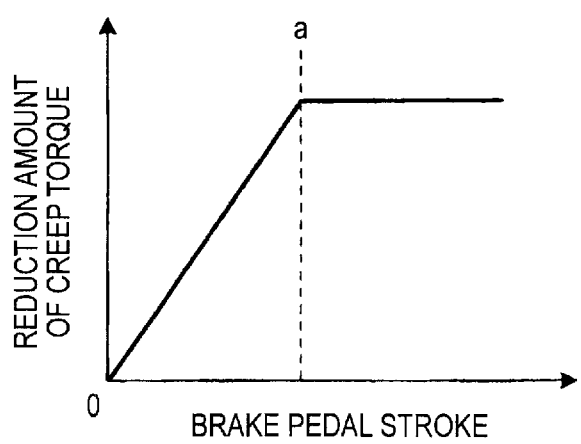
FIG. 4 is a graph showing a relationship between a stroke of a brake pedal and a reduction amount of a creep torque.
Figure 5:
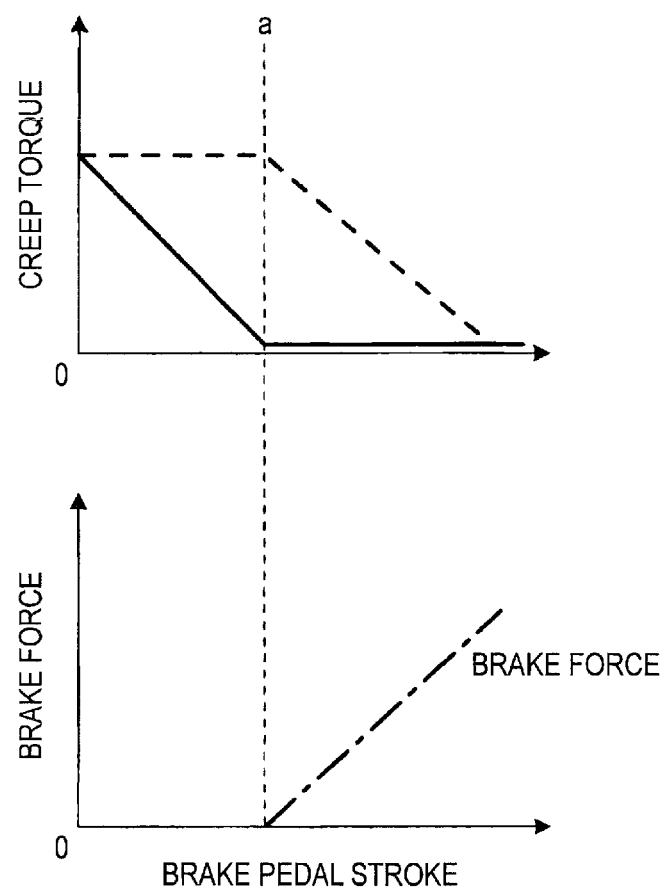
FIG. 5 is a graph showing relationships between the stroke of the brake pedal and the creep torque when a brake is normal and abnormal.
Figure 6:
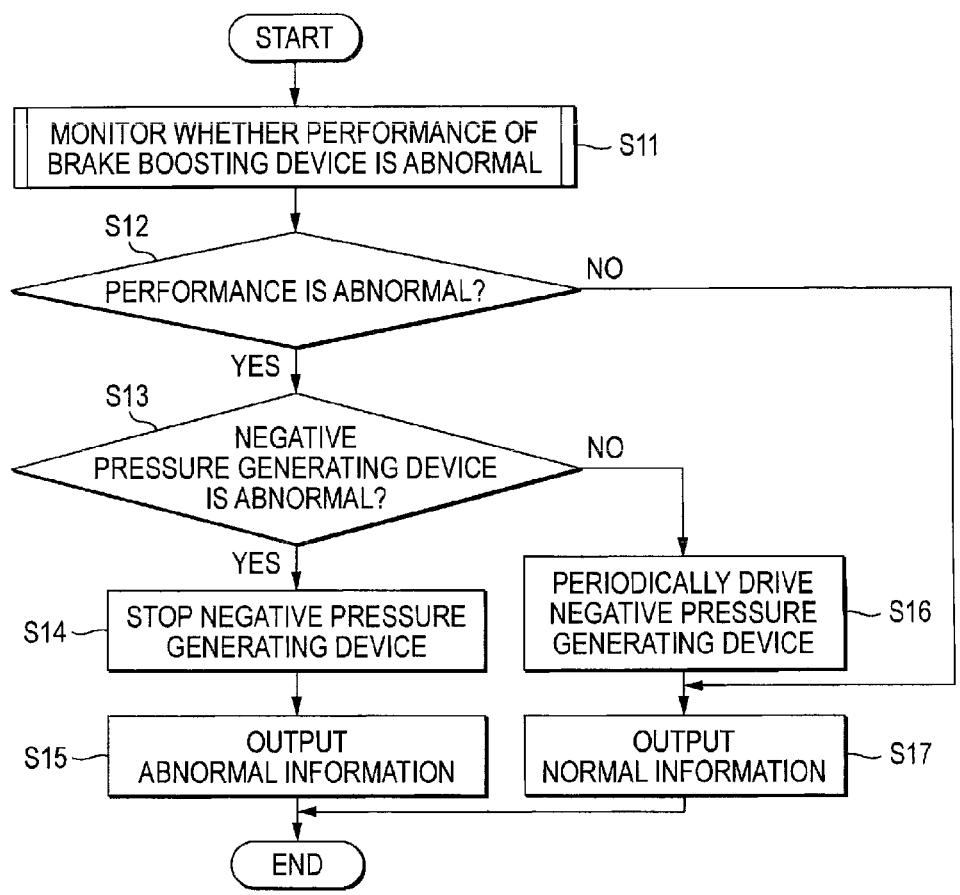
FIG. 6 is a flowchart explaining a monitoring whether performance of a brake boosting device is abnormal as a monitoring whether generation of a brake force is abnormal in the control shown in FIG. 2.
Figure 7:
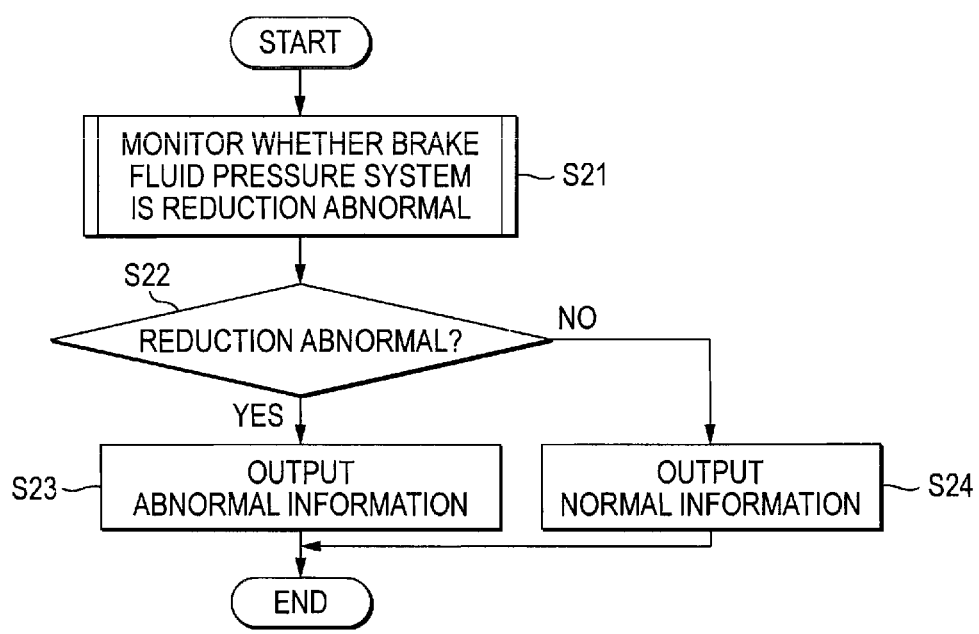
FIG. 7 is a flowchart explaining a monitoring whether a brake fluid pressure system is reduction abnormal as a monitoring whether generation of a brake force is abnormal in the control shown in FIG. 2.

FIG. 1 is a schematic configuration diagram showing a vehicle driving force control device according to an exemplary embodiment of the present invention, and FIG. 2 is a flowchart explaining the control in the vehicle driving force control device shown in FIG. 1. FIGS. 3 to 5 are graphs to be used in the control shown in FIG. 2. FIG. 3 is a graph showing the relationship between a vehicle velocity and a creep torque, FIG. 4 is a graph showing the relationship between a stroke of a brake pedal and a reduction amount of a creep torque, and FIG. 5 is a graph showing the relationships between the stroke of the brake pedal and the creep torque when a brake is normal and abnormal. FIGS. 6 and 7 are flowcharts specifically explaining the monitoring whether brake force is abnormal in the control shown in FIG. 2. FIG. 6 is a flowchart explaining the monitoring whether the performance of a brake boosting device is abnormal, and FIG. 7 is a flowchart explaining the monitoring whether the brake fluid pressure system is reduction abnormal.

In the vehicle driving force control device of the present exemplary embodiment, a vehicle 10 is an electric vehicle (EV). In the vehicle 10, a wheel velocity sensor 12 detecting a wheel velocity of a wheel 11 and a brake 13 (including calipers 13a and a disk 13b; a brake unit) braking the wheel 11 are installed in each wheel 11. A brake fluid (brake oil) is supplied from a brake fluid pipe 31 to each brake 13, and a brake fluid pressure is detected by a brake fluid pressure sensor 15 (a pressure detecting unit) installed in a calculation device 14.

The wheel velocity sensor 12 is electrically connected to the calculation device 14 through a wiring 32, and a vehicle velocity of the vehicle 10 is calculated by a vehicle velocity calculating unit 16 installed in the calculation device 14 based on the output value detected by the wheel velocity sensor 12.

The brake fluid is supplied to the brake 13 by stepping on a brake pedal 17. Specifically, a stroke amount of the brake pedal 17 is detected by a brake pedal stroke sensor 21 (a stroke amount detecting unit). Herein, a negative pressure generating device 18 (a pressure generating unit) is connected to a brake boosting device 19 (a boosting unit) through a negative pressure pipe 34 and a negative pressure generated by the negative pressure generating device 18 is supplied to the brake boosting device 19 (the boosting unit) and the negative pressure is detected by a negative pressure sensor 22. Based on the detected stroke amount, a stepping force for the brake pedal 17 is assisted by the brake boosting device 19. A brake fluid with a pressure corresponding to a force after assisting the stepping force is supplied by a master cylinder 20 (a supplying unit). The brake force is generated by using the brake fluid pressure supplied from the master cylinder 20. By controlling the brake fluid pressure, the brake force of the brake 13 is controlled.

A driving shaft 23 of the vehicle 10 is connected with a motor 26 through a differential 24, and voltage from a battery (not shown) is converted by an inverter 27 to be supplied to the motor 26, thereby driving the driving shaft 23. In this case, a rotation number of the motor 26 is detected by a motor rotation number sensor 25.

In the vehicle 10, a main control device 28 integrally controls the vehicle 10. And the brake fluid pressure and the wheel velocity detected and calculated by the above-described calculation device 14 are transmitted to the main control device 28 through a controller area network (CAN) bus 33 and further, the stroke amount detected by the brake pedal stroke sensor 21 and the negative pressure detected by the negative pressure sensor 22 are transmitted to the main control device 28 through the wiring 32. A motor torque outputted from the motor 26 is transmitted from the main control device 28 to the inverter 27 through the CAN bus 33. The main control device 28 includes a motor torque control unit 29 (a creep torque control unit) and a brake force generation error monitoring unit 30 (a monitoring unit) and the control of a creep torque to be described below is performed by using the units.

First, referring to FIGS. 2 to 5, the control of switching the creep torque will be described.

It is monitored whether generation of the brake force is abnormal (step S1). The detailed method of monitoring whether the generation of the brake force is abnormal will be described in FIGS. 6 and 7 hereinafter.

When the generation of the brake force is abnormal, the process proceeds to step S3, and when the generation of the brake force is not abnormal, the process proceeds to step S4 (step S2).

When the generation of the brake force is abnormal, the creep torque generated by the brake stroke sensor 21 is outputted (step S3).

Herein, referring to FIGS. 3 to 5, the creep torque will be described when the generation of the brake force is abnormal.

The EV is configured to generate the creep phenomenon like the engine AT vehicle. In the vehicle 10 of the exemplary embodiment, the motor 26 is controlled to generate the creep torque. The magnitude of the creep torque varies depending on the vehicle velocity as shown in FIG. 3. For example, in a velocity range of zero to a low velocity, the creep torque is maintained to be constant and maximum, but in a higher velocity range than the velocity range (of 0 to the low velocity), the creep torque decreases depending on the vehicle velocity, and further, in a high velocity range, the creep torque is maintained to zero. As described above, in the present exemplary embodiment, a reference creep torque is acquired based on the vehicle velocity of the vehicle 10 acquired by the wheel velocity sensor 12 and the vehicle velocity calculating unit 16.

Herein, as described above, the creep torque generated by the brake stroke sensor 21 is outputted. More specifically, as shown in FIG. 4, a reduction amount of the creep torque is acquired according to the stroke amount detected by the brake stroke sensor 21, and the creep torque reduction amount increases in proportion to the stroke amount in the range of 0 to a, and the creep torque reduction amount is maintained to be constant and maximum in a range where the stroke amount is larger than a. By subtracting the creep torque reduction amount acquired as the above from the reference creep torque acquired based on the vehicle velocity, a target creep torque is acquired. When the generation of the brake force is abnormal, a creep torque represented by a bold line of FIG. 5 is outputted.

In FIGS. 4 and 5, the range where the stroke amount is in the range of zero to a corresponds to a so-called allowance (a dead zone) of the brake pedal 17, and the creep torque is reduced as the stroke amount increases by actively using the range. Meanwhile, when the stroke amount is larger than a, the outputted creep torque becomes zero or a slight torque, such that the brake force increases in proportion to the stroke amount (see an alternated long and short dash line in FIG. 5). The range where the stroke amount is in the range of zero to a is the same as the range of the dead zone of the brake pedal 17, but an offset may be provided with respect to the range of the dead zone. In this case, even through the brake force starts to increase as the stroke amount increases, the creep torque decreases for some time and thereafter, the outputted creep torque is maintained to zero or the slight torque.

Meanwhile, when the generation of the brake force is not abnormal, that is, when the generation of the brake force is normal, a creep torque represented by a dotted line of FIG. 5 is outputted (step S4).

Herein, referring to FIGS. 3 and 5, the creep torque when being normal will be described.

Even when the generation of the brake force is not abnormal, based on the vehicle velocity of the vehicle 10 acquired by the wheel velocity sensor 12 and the vehicle velocity calculating unit 16, a reference creep torque is acquired (see FIG. 3).

However, herein, unlike step S3 described above, the creep torque is outputted depending on the brake fluid pressure detected by the brake fluid pressure sensor 15 of the calculation device 14. In this case, the range where the stroke amount is in the range of zero to a is the dead zone range, and since the brake fluid pressure does not increase, the reference creep torque acquired based on the vehicle velocity is used as represented by the dotted line of FIG. 5. Meanwhile, in the range where the stroke amount is larger than a, the brake fluid pressure increases, and as a result, the creep torque is reduced according to the increase. Consequently, the outputted creep torque is maintained to zero or the slight torque and further, the brake force increases.

As described above, the control of the creep torque is switched depending on whether the generation of the brake force is abnormal. The creep torque generated by the brake stroke sensor 21 (the stroke amount) is outputted when the generation of the brake force is abnormal, and the creep torque generated by the brake fluid pressure sensor 15 (the brake fluid pressure) is outputted when the generation of the brake force is not abnormal. The switching of the control and the generation of the creep torque are not limited to be performed by the pedal stroke sensor but may also be performed by a stop lamp switch.

Therefore, even when the brake force is reduced due to an error in an oil pressure system (an error in the output of the brake fluid pressure sensor 15) or an error in a negative pressure system (errors in various sensors such as an error in the output of the negative pressure sensor 22 or an error associated with the negative pressure generating device 18 such as an error in an electric motor pump), the control is performed in the range where the stroke amount is in the range of zero to a until the brake fluid pressure increases by using the creep torque generated as above, and as a result, the creep torque can be reduced without strongly stepping the brake pedal 17, and the feeling as if the vehicle is pushed out can be eliminated. When the brake pedal 17 is not operated, the same creep torque as that when being normal can be outputted.

Next, as the detailed method of monitoring whether the generation of the brake force is abnormal, a method of monitoring whether the performance of the brake boosting device is abnormal, which is performed by the brake force generation error monitoring unit 30, will be described with reference to FIG. 6. The monitoring method described below may be applied to the case where the brake boosting device is the positive pressure type as well as the case where the brake boosting device is the negative pressure type. The monitoring method may be applied even to the case where the brake boosting device assists the stepping force by the motor and in this case, it is monitored whether the generation of the brake force is abnormal due to a fault of the motor.

It is monitored whether the performance of the brake boosting device 19 is abnormal or not (step S11). Specifically, a power supply circuit thereof is monitored, a motor driving condition is monitored, or the output values of the negative pressure sensor 22 and the brake fluid pressure sensor 15 are compared with each other. For example, when the output values of the negative pressure sensor 22 and the brake fluid pressure sensor 15 are compared with each other, it is determined in the following cases that the performance is abnormal. As the compared output value, for example, output values of sensor types such as the brake stroke sensor 21 and the stop lamp switch may be used.

(1) When variation in the brake fluid pressure is greater than a set value, if variation in the negative pressure value is smaller than a set value, the performance is abnormal.

(2) When variation in the brake fluid pressure is smaller than a set value, if variation in the negative pressure value is greater than a set value, the performance is abnormal.

When the performance of the brake boosting device 19 is abnormal, the process proceeds to step S13, and when the performance of the brake boosting device 19 is not abnormal, the process proceeds to step S17 (step S12).

When the performance of the brake boosting device 19 is abnormal, it is checked whether the negative pressure generating device 18 is abnormal, and when the negative pressure generating device 18 is abnormal, the process proceeds to step S14, and when the negative pressure generating device 18 is not abnormal, the process proceeds to step S16 (step S13).

When the negative pressure generating device 18 is abnormal, specifically, in the case where the negative pressure generating device 18 cannot be driven because the driving circuit and the motor are abnormal or in the case where it is determined that the performance deteriorates, the negative pressure generating device 18 stops and abnormal information is outputted (steps S14 and S15). In this case, the control of the creep torque is switched to the control when being abnormal, and as described in step S3 above, the creep torque generated by the brake stroke sensor 21 (the stroke amount) is outputted.

Meanwhile, when the negative pressure generating device 18 is not abnormal, specifically, when it is suspected that the negative pressure sensor 22 is faulty, the negative pressure is maintained by periodically driving the negative pressure generating device 18 (step S16). When the performance of the brake boosting device 19 is not abnormal including even the case where the negative pressure generating device 18 is not abnormal, it is not determined that the performance is abnormal, but normal information is outputted (step S17). In this case, the creep torque is controlled in such a manner that it is controlled when the negative pressure generating device 18 is normal and as described in step S4 above, the creep torque generated by the brake fluid pressure sensor 15 (the brake fluid pressure) is outputted.

As the detailed method of monitoring whether the generation of the brake force is abnormal, a method of monitoring whether the brake fluid pressure system is reduction abnormal, which is performed by the brake force generation error monitoring unit 30, will be described with reference to FIG. 7.

It is monitored whether the brake fluid pressure system is reduction abnormal or not (step S21). Specifically, the output value of the brake fluid pressure sensor 15, a power train output (the output of the motor 26), and the output value of the wheel velocity sensor 12 are compared with each other. For example, when the output value of the brake fluid pressure sensor 15 and the output value of the wheel velocity sensor 12 are compared with each other, it is determined in the following cases that the brake fluid pressure system is reduction abnormal. As the compared output value, for example, output values of sensor types such as the brake stroke sensor 21, the motor rotation number sensor 25, the stop lamp switch, and an acceleration sensor may be used.

(1) When the brake fluid pressure is greater than a set value, if deceleration is smaller than a set value, the brake fluid pressure system is reduction abnormal.

(2) When the brake fluid pressure is smaller than a set value, if deceleration is greater than a set value, the brake fluid pressure system is reduction abnormal.

When the brake fluid pressure system is reduction abnormal, the process proceeds to step S23, and when the brake fluid pressure system is not reduction abnormal, the process proceeds to step S24 (step S22).

When the brake fluid pressure system is reduction abnormal, the abnormal information is outputted (step S23). In this case, the control of the creep torque is switched to the control when being abnormal, and as described in step S3 above, the creep torque generated by the brake stroke sensor 21 (the stroke amount) is outputted.

Meanwhile, when the brake fluid pressure system is not reduction abnormal, the normal information is outputted (step S24). In this case, the creep torque is controlled in such a manner that it is controlled when the brake fluid pressure system is normal, and as described in step S4 above, the creep torque generated by the brake fluid pressure sensor 15 (the brake fluid pressure) is outputted.

In the present exemplary embodiment, the EV is described as an example, but when a target of the creep torque controlled by the main control device 28 is changed from the motor to the engine, the present invention may be applied to the engine AT vehicle as well.

According to an aspect of the present invention, it is possible to eliminate the feeling as if a vehicle is pushed out by reducing a creep torque when a brake force is erroneously generated.

The present invention can be applied to the hybrid vehicle or the engine AT vehicle as well and is suitable for the EV.

What is claimed is:

1. A vehicle driving force control device comprising:
   a brake unit configured to generate a brake force of the vehicle;
   a stroke amount detecting unit configured to detect a stroke amount of a brake pedal of the vehicle;
   a monitoring unit configured to monitor whether generation of the brake force of the brake unit is abnormal; and
   a creep torque controlling unit configured to output a creep torque of the vehicle generated by the stroke amount detecting unit, and increase a reduction amount of the creep torque of the vehicle as the stroke amount increases, when the monitoring unit determines that the generation of the brake force in the brake unit is abnormal.

2. The vehicle driving force control device according to claim 1, wherein the creep torque controlling unit increases the reduction amount of the creep torque as the stroke amount increases in a range of a dead zone of the brake pedal.

3. The vehicle driving force control device according to claim 1, wherein
   the brake unit includes a boosting unit that assists a stepping force for the brake pedal based on the detected stroke amount, and
   the monitoring unit determines that the generation of the brake force in the brake unit is abnormal when performance of the boosting unit is abnormal.

4. The vehicle driving force control device according to claim 3, wherein
   the brake unit includes a pressure generating unit that generates a pressure supplied to the boosting unit, and
   the monitoring unit periodically drives the pressure generating unit even when the performance of the boosting unit is abnormal.

5. The vehicle driving force control device according to claim 1, wherein
   the brake unit generates the brake force by using a fluid pressure of a brake fluid and includes a fluid pressure detecting unit that detects the fluid pressure of the brake fluid, and
   the monitoring unit determines that the generation of the brake force in the brake unit is abnormal when the detected fluid pressure of the brake fluid is reduction abnormal.

* * * * *